No. 628,036. Patented July 4, 1899.
F. W. PROKOV.
SECTION CIRCUIT CLOSER.
(Application filed Jan. 28, 1897.)

(No Model.) 4 Sheets—Sheet 1.

Witnesses:
W. C. Pinckney
C. Holloway

Inventor:
Friedrich Wilhelm Prokov,
By J. E. M. Bowen
Attorney

THE NORRIS PETERS CO., PHOTO-LITHO., WASHINGTON, D. C.

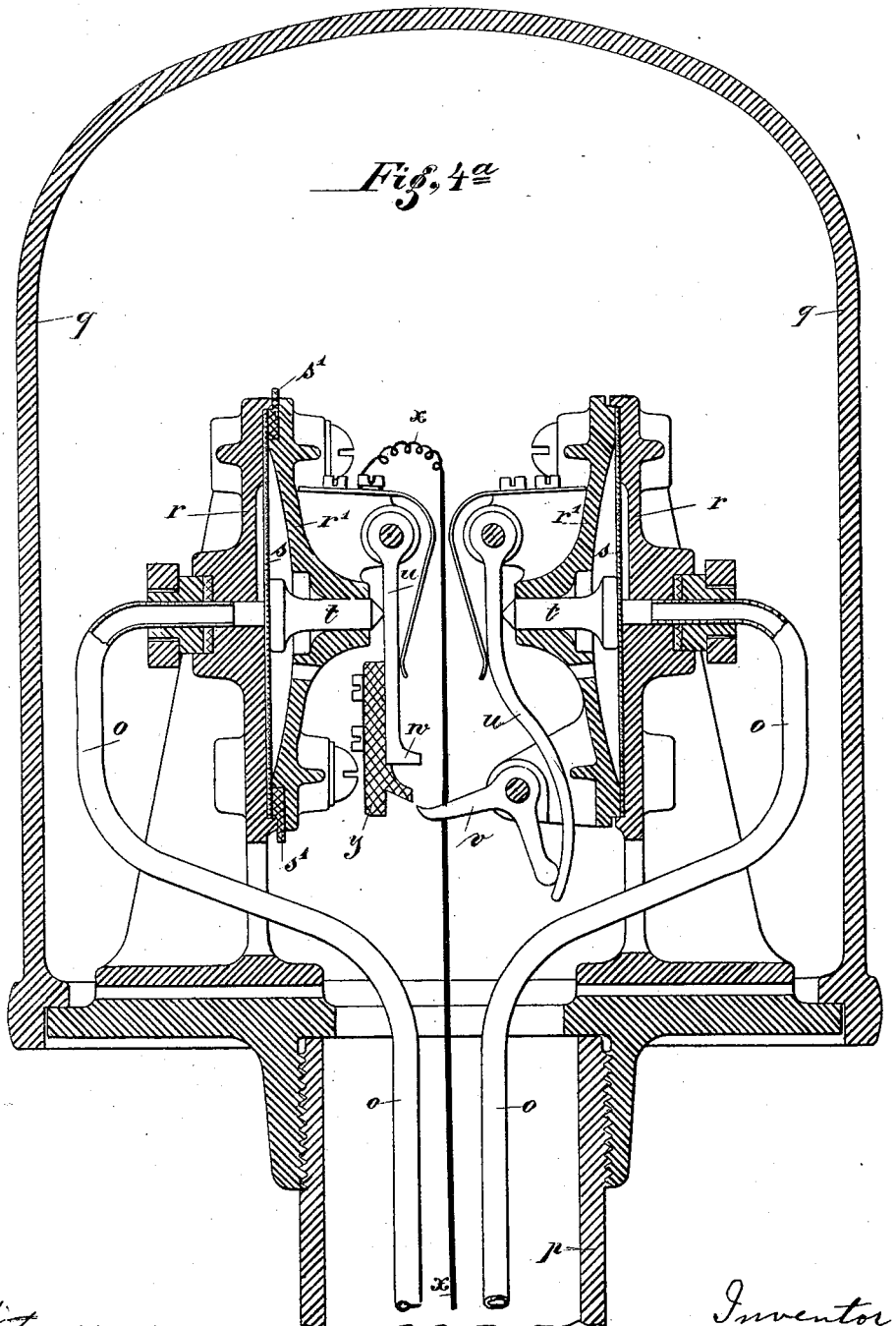

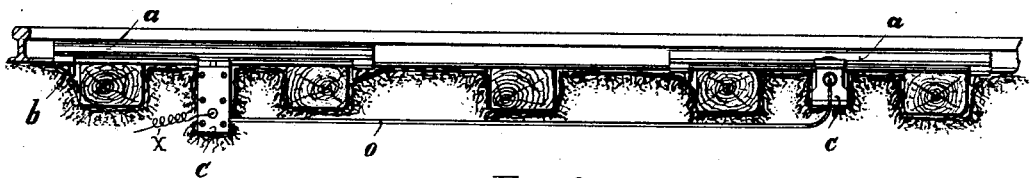
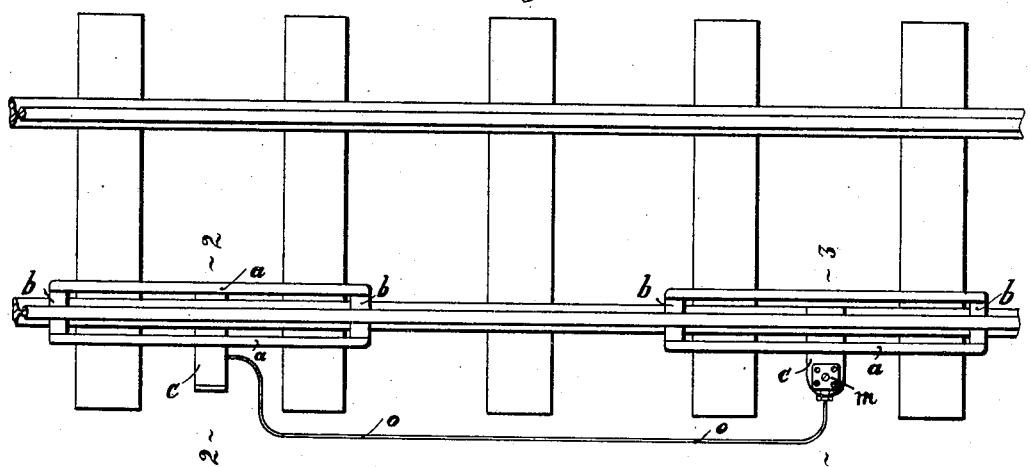
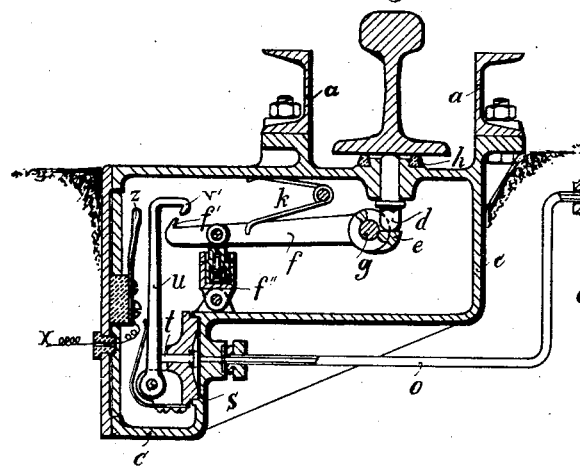
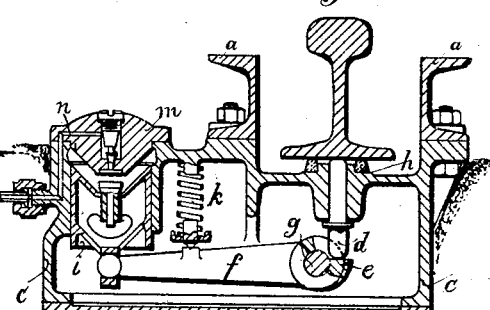

No. 628,036. Patented July 4, 1899.
F. W. PROKOV.
SECTION. CIRCUIT CLOSER.
Application filed Jan. 28, 1897.
(No Model.) 4 Sheets—Sheet 4.
*Fig. 9.*
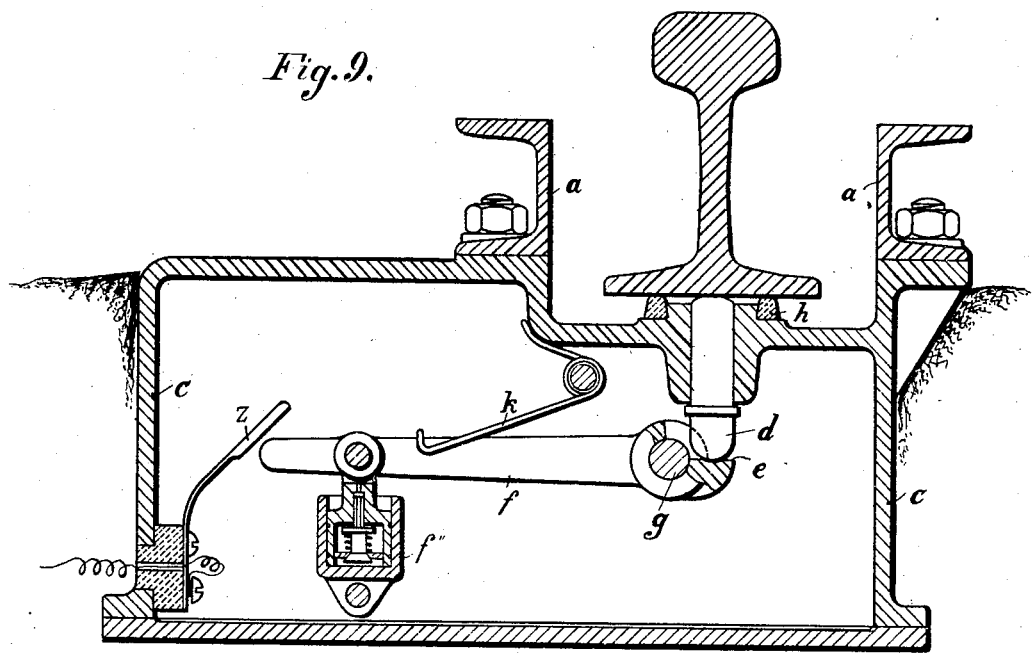
*Fig. 10.*
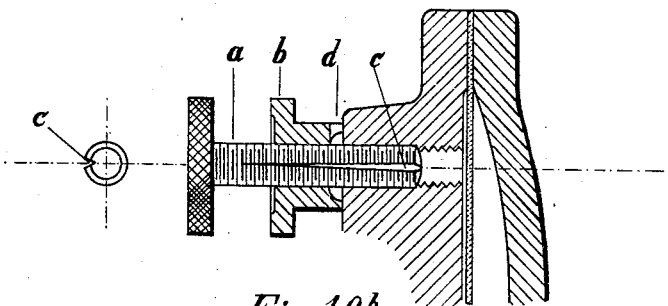
*Fig. 10½.*
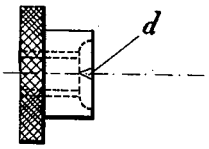
Witnesses:
W. C. Pinckney
C. Holloway
Inventor:
Friedrich Wilhelm Prokov,
By J. E. M. Dowen
Attorney

UNITED STATES PATENT OFFICE.

FRIEDRICH WILHELM PROKOV, OF HAMBURG, GERMANY, ASSIGNOR OF TWO-THIRDS TO BOLDS & VOGEL AND HEINRICH VAN HEESE, OF SAME PLACE.

SECTION CIRCUIT-CLOSER.

SPECIFICATION forming part of Letters Patent No. 628,036, dated July 4, 1899.

Application filed January 28, 1897. Serial No. 621,051. (No model.)

*To all whom it may concern:*

Be it known that I, FRIEDRICH WILHELM PROKOV, a subject of the King of Saxony, residing in the city of Hamburg, Germany, have invented certain new and useful Improvements in Section Circuit-Closers, of which the following is a specification.

This invention relates to that class of circuit-closers which are automatically operated by a railway-train, the flection of one of the rails caused by the weight of the train being communicated to an unequally-armed lever, which directly or indirectly closes the signaling-circuit.

The object of this invention is to provide a special arrangement of such an apparatus, and, further, the combination of two such apparatus in such a manner that the one apparatus on the passage of a train in one direction causes the terminals or contact-pieces of a signaling-circuit to come into contact, while the other apparatus on the passage of a train in the opposite direction will prevent the contact of the same terminals. In the accompanying drawings the said special arrangement is illustrated and the combination above characterized is represented in two practical forms.

Figure 1:
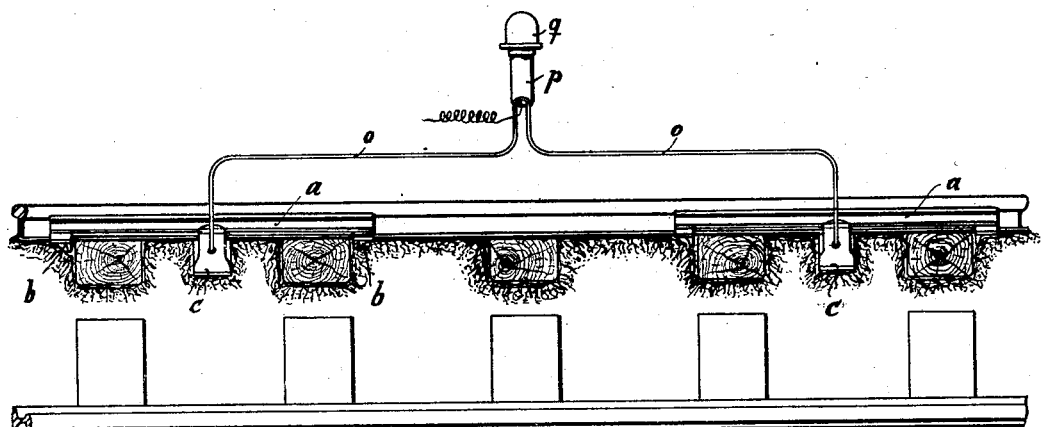
Figure 2:
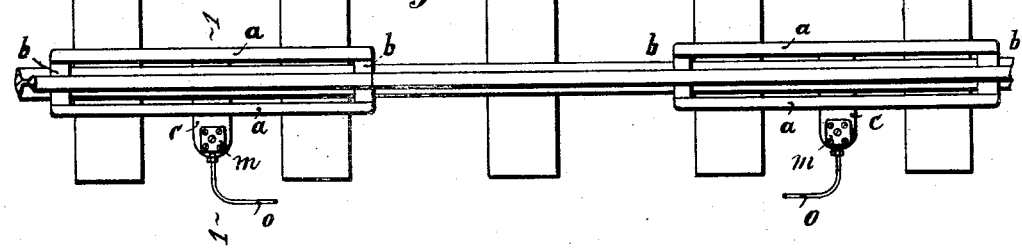
Figure 3:
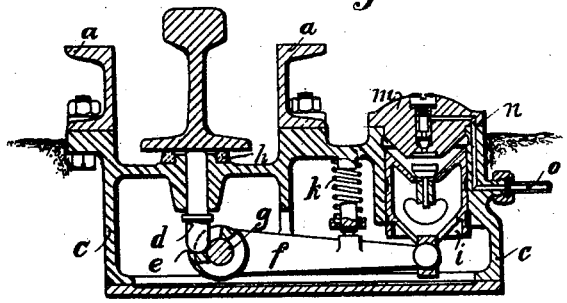
Figure 4:
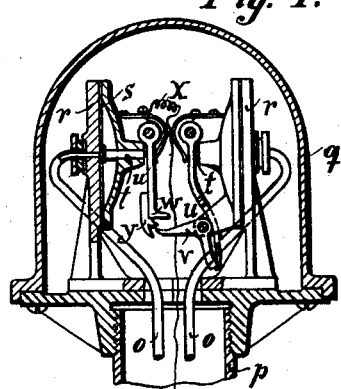

Of the first form, Figure 1 is a side view of a line of rails with the combined apparatus adapted thereto, and Fig. 2 is a plan view of the same. Fig. 3 is a vertical section, on an enlarged scale, taken on the line 1 1 of Fig. 2; and Fig. 4 is a vertical section through the contact-maker and its inclosing casing. Fig. 4$^a$ is an enlarged sectional view of the same parts shown in Fig. 4. Fig. 5 is a side view, partly in section, of a line of rails with a modified form of combined apparatus, Fig. 6 being a plan view of the same. Fig. 7 is a vertical section on the line 2 2, Fig. 6; and Fig. 8 is a similar view on the line 3 3, Fig. 6. Fig. 9 is a side view, partly in section, on an enlarged scale, of a modification of the apparatus shown at Fig. 7; and Figs. 10, 10$^a$, and 10$^b$ are details, which will be more fully referred to hereinafter.

Referring now to Figs. 1, 2, 3, and 4, the apparatus combination consists of two actuating devices arranged on the same rail at a certain distance apart and constructed exactly alike, so that only one needs to be described. On either side of and parallel with a rail, as seen in Fig. 2, is laid a metal bar, preferably of a ⊏-shaped piece of iron $a$. These pieces of iron $a$, which lie across two adjacent sleepers, so as not to be in contact with the latter, are connected at their ends where they project over the sleepers by cross-bars or angle-irons $b$, so as to form a frame, the cross-bars $b$ constituting the bases or foundations of said frame and being fixed to the rail. This frame carries at its middle and on its under side a closed casing $c$, screwed thereto. (See Fig. 3.) In that portion of the top of the box $c$ which is between the frame there works freely immediately below the foot of the rail a bolt $d$, the upper end of which rests against the foot of the rail. At its lower end this bolt rests upon a projection $e$, formed on the boss of the lever $f$ and radially to the pivot-pin $g$. A projecting boss in the top of the box is surrounded by a rubber ring $h$, which prevents the penetration of dust and moisture between the foot of the rail and the bolt $d$. The projection $e$, on which the bolt rests, constitutes the short arm of the lever $f$, the longer arm terminating in a ball which takes into a recess in the rod of a piston $i$, provided at its center with a suction-valve. The valve-plunger slides in a cylinder formed in the casing $c$, and if the rail is not depressed or deflected is held in its lowest or normal position by a spring $k$, acting on the longer arm of the lever $f$. The spring $k$ also so operates that the bolt $d$ is always pressed up against the foot of the rail. Upon the rail being depressed by the train passing over it the long arm of the lever $f$, through the action of the bolt $d$ and projection $e$, lifts the valve-piston $i$. The piston thus raised forces the air which is above it through an adjustable valve in the cylinder-cover $m$ into a passage $n$ and thence into the pressure or delivery pipe $o$, connected therewith. After each depression the rail rises again, the spring $k$ causing the valve-piston to descend, so that a fresh supply of air is drawn in, which air on the next lift or stroke is forced into the pressure-pipe. The pressure-pipes $o$ of both these what may be termed "pumping apparatus," arranged one behind the other, are carried to a hollow standard $p$, Fig. 1, in which they are led upward into a hood or cap $q$, (see Fig. 4,) so as to be protected by the said standard and cap. Each of the pressure-tubes $o$ terminates in a casing $r$, between the two parts of which is fixed airtight a flexible diaphragm $s$. At the opposite side of the diaphragm and in a line with the pressure-tube is a pin $t$, which projects through a boss in the casing and operates a pivotally-suspended lever $u$. The two diaphragm-pins $t$ face each other, and the two levers $u$ are situated between them, each of the said levers $u$ being kept pressed against its pin $t$ by a spring.

When the right-hand pumping apparatus in Fig. 2 is operated by a train or a single vehicle passing over it, the air in its pressure-pipe $o$, the end of which is in Fig. 4 at the right-hand side, is compressed by the operation of its corresponding valve-piston, so that the diaphragm blocking the pipe $o$ is distended to the left and its pin $t$ and the lever $u$ moved to the left. The free end of this lever $u$ operates a bell-crank lever $v$, pivotally mounted on the right-hand casing $r$, and rotates this bell-crank until the horizontal arm of the bell-crank $v$ presses on a lateral projection $w$ of the opposite lever $u$, connected to the aerial line-wire $x$. The left lever $u$, the cover $r'$ of the left casing $r$, and the left pin $t$ are insulated from the bottom part of the left casing $r$ by the diaphragm $s$ being of insulating material and by a ring $s'$, of hard rubber, inserted between the cover $r'$ and the bottom part of the casing $r$. The signaling-circuit is thus completed from the line-wire $x$ through the left lever $u$, crank-lever $v$, the right lever $u$, and the right-hand casing $r$, not insulated from the last-mentioned lever $u$, the tubes $o$ forming part of the earth-return. The circuit being made and broken through the bell-crank lever $v$, unless said lever be in contact with both levers $u$, as above stated, the circuit will not be complete. For increased safety a line-wire may be connected to the buried pressure-tubes, which wire leads into the underground water. The train as it proceeds then operates the second pump apparatus, lever $u$ of which is moved outwardly, so that the projection $w$ of the latter slides upon the raised arm of the bell-crank $v$, thereby securing a good sliding contact and keeping the contact-surfaces bright. The projection $w$ is of such length that it cannot slip off the lifted arm. The circuit thus remains completed without interruption till the last wheel of the train has passed over both pump apparatus and the pressure of the compressed air in the tubes $o$ has again sunk to that of the atmosphere, this being obtained because a portion of the air escapes through the regulating device described hereinafter. Upon a train passing from left to right—that is, first over the left-hand pumping arrangement in Fig. 2—then the lever $u$ on the left in the apparatus shown in Fig. 4 and having the insulated fork $y$, first operates so that this fork catches the lever $v$, this latter being then blocked, and prevented from coming into engagement with the projection $w$, in consequence of which, the circuit remains open.

Referring now to the modification illustrated in Figs. 5 to 8, those parts corresponding to those of the previously-described construction are designated by the same reference-letters. In this second construction only the apparatus shown in Fig. 6 on the right hand is provided with a pump. (See also Fig. 8.) The pressure-pipe $o$ of this pump is carried into the box $c$ of the apparatus shown on the left hand of Fig. 6. (See also Fig. 7.) The air compressed by the pump operates again on the diaphragm $s$ and its pin $t$, which, when the apparatus shown in Fig. 8 is operated first by the train, presses the contact-lever $u$ against the contact-plate $z$, and thus closes the circuit. When the wheels of the train pass first over the apparatus shown at Fig. 7, the hooked nose $f'$ of the unequally-armed lever $f$ catches the nose $v'$ of the lever $u$ and holds it fast, so that the air-pressure produced by the passage of the train over the second apparatus, Fig. 8, cannot bring the lever $u$ into contact with the contact-plate $z$. The longer arm of the lever $f$, Fig. 7, is connected to the piston of a dash-pot $f''$ to allow the lever to return only slowly to its normal position.

The apparatus shown in Fig 7 when modified as shown in Fig. 9 will give always signals whether a train passes in one or the other direction. This modified arrangement is principally adapted for use in checking the speed of trains. In this case the longer arm of the lever $f$ is pressed against the contact-plate $z$ by the sagging of the rail, and after the train has passed over the apparatus the lever $f$ falls slowly, under the influence of the dash-pot $f'''$, back to its normal position.

To adapt the duration of the closure of the circuit to requirements, there is provided on each diaphragm-casing or at any other convenient place a device for regulating the escape of air. Said device may consist of a regulating-screw device, a valve arrangement, or the like. Such a regulating device is shown at Fig. 10 in side view, partly in section. This device consists of a screw $a$, provided along its length with a thread, and a conical groove $c$, widening toward the end of the screw. (See Figs. 10 and 10$^a$.) The screw carries a lock-nut $b$ for the purpose of holding the screw in any determined position in the diaphragm-casing $r$. To facilitate the escape of air, the lock-nut is coned out on its under side and has a notch $d$ cut in it. (See also Fig. 10$^b$.) When the screw is screwed fully into the casing $r$, very little air can escape through the groove $c$ and the duration of the contact will be proportionately increased. The unscrewing of the screw $a$, on the other hand, brings a wider part of the groove c into position and allows for a more rapid escape of the air from the casing r, and therefore an earlier breaking of the circuit.

All the devices herein described are placed conveniently to the auxiliary rails a, (see Figs. 1, 2, 5, and 6,) which have their points of support in the railway-rail a greater distance apart than has been hitherto customary, these points being beyond two adjacent sleepers. In consequence of this arrangement the "sagging" movement of the railway-rails is better utilized than if each apparatus be fixed on two adjacent sleepers, and as a result a sure and certain action of the apparatus is secured, even with trains traveling at the highest speeds. The above-described "circuit-closer" is connected by a single line-wire with the arm, disk, and light signals, alarm-bells and the like, placed in convenient positions, so that the particular signal is brought or communicated at the same instant to the desired signaling position or point as the train or portion of a train passes over the particular contact-maker. This apparatus is adapted as a security against collisions on entering and leaving a station and at crossings, tunnels, bridges, sharp curves, heavy gradients, &c.

On block-sections the contact-makers can be connected to the block-signals in such manner that the train as it passes from block to block signals its presence ahead, simultaneously blocks the section or block over which it has just passed, and also at the same time unblocks the train following it from block to block in such a way that there is always one completely-blocked section between two trains, and the trains are thus allowed to follow each in the closest possible order with the minimum amount of distance between each. The contact-maker may also operate alarm apparatus connected with a movable or adjustable disk in such manner that at a sufficient period of time before the train passes a level crossing the alarm sounds and the disk shows a signal "stop," while when the train has passed the said crossing the arm shows the signal "clear" and the alarm is silenced.

Having now described my invention, what I desire to claim is—

1. A signaling apparatus for railways, consisting of two devices or apparatus placed below one of the rails a certain distance apart, each provided with a vertically-sliding bolt $d$, one end of which abuts against the foot of the rail, and the other upon an unequally-armed lever $f$, and operated by the sagging of the rail and in communication with contact devices or apparatus, in such manner, that one apparatus on the passage of a train in one direction, causes the approach of the contact devices, while the other apparatus, on the passage of a train in the opposite direction, prevents the said contact devices from coming together, substantially as described.

2. In a signaling apparatus for railways, the combination with a rail, two air-pumps, pressure-pipes extending therefrom, mechanism between said rail and pumps for operating the pumps by sagging of the rail, distensible bodies closing the pressure-pipes at the ends most distant from said pumps, a signal-circuit, a circuit-closer operated by one of said distensible bodies and adapted to close said circuit when its distensible body is operated first, and means for preventing the closure of said circuit when the other distensible body is operated first.

3. In an air-pump, the apparatus for regulating the outflow of the air, consisting of a screw entering into and engaging with the air-outlet, and having a longitudinal groove gradually widening toward its outer end, and a lock-nut for engaging with said screw, and having a recess in its inner side, substantially as described.

In testimony whereof I have signed my name to this specification in the presence of two subscribing witnesses.

FRIEDRICH WILHELM PROKOV.

Witnesses:
EMIL KÜMPEL,
G. DIERR.